United States Patent Office 3,733,316
Patented May 15, 1973

3,733,316
NOVEL 17β-(TETRAHYDROPYRAN-4-YLOXY)STEROIDS
John A. Edwards, Los Altos, Calif., assignor to Syntex Corporation, Panama, Panama
No Drawing. Filed Apr. 20, 1971, Ser. No. 135,757
Int. Cl. C07c 173/00
U.S. Cl. 260—239.55 R
17 Claims

ABSTRACT OF THE DISCLOSURE

Novel 17β-(tetrahydropyran-4-yloxy) steroid ethers are disclosed. Specifically, 17β-(tetrahydropyran-4-yloxy) ethers of androstane and estrane series are disclosed together with a method for their preparation and a discussion of their unexpected biological activity, inter alia, as anabolic/androgenic agents.

---

The present invention relates to novel steroid ethers. More particularly, the present invention is related to steroid ethers of the androstane and estrane series in which the novel tetrahydropyran-4-yloxy ether grouping is attached at the C–17β position and can be depicted by the following formula:

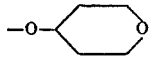

The novel compounds of the present invention bearing said novel group can be further represented by the following structural formulas:

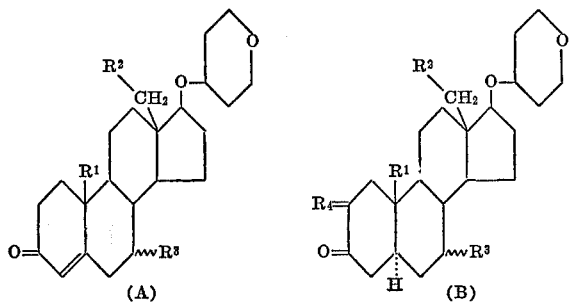

In the above and succeeding formulas;

$R^1$ is hydrogen or methyl;
$R^2$ is hydrogen, methyl, or ethyl;
$R^3$ is hydrogen, α-methyl, or β-methyl;
$R^4$ is hydroxymethylene or the group

in which
$R^5$ is hydrogen or methyl.

Thus included within the scope of the novel compounds of the present invention are the following:

17β-(tetrahydropyran-4-yloxy)-estr-4-en-3-one;
17β-(tetrahydropyran-4-yloxy)-androst-4-en-3-one;
7α-methyl-17β-(tetrahydropyran-4-yloxy)-estr-4-en-3-one;
7β-methyl-17β-(tetrahydropyran-4-yloxy)-estr-4-en-3-one;
7α-methyl-17β-(tertahydropyran-4-yloxy)-androst-4-en-3-one;
7β-methyl-17β-(tetrahydropyran-4-yloxy)-androst-4-en-3-one;

and the corresponding 18-methyl and 18-ethyl compounds thereof;

17β-(tetrahydropyran-4-yloxy)-5α-estran-3-one;
17β-(tetrahydropyran-4-yloxy)-5α-androstan-3-one;
7α-methyl-17β-(tetrahydropyran-4-yloxy)-5α-estran-3-one;
7β-methyl-17β-(tetrahydropyran-4-yloxy)-5α-estran-3-one;
7α-methyl-17β-(tetrahydropyran-4-yloxy)-5α-androstan-3-one;
7β-methyl-17β-(tetrahydropyran-4-yloxy)-5α-androstan-3-one;

and the corresponding 18-methyl and 18-ethyl compounds thereof;

2α-methyl-17β-(tetrahydropyran-4-yloxy)-5α-estran-3-one;
2α-methyl-17β-(tetrahydropyran-4-yloxy)-5α-androstan-3-one;
2-hydroxymethylene-17β-(tetrahydropyran-4-yloxy)-5α-estran-3-one;
2-hydroxymethylene-17β-(tetrahydropyran-4-yloxy)-5α-androstan-3-one;

and the corresponding 7α-methyl, 7β-methyl, 18-methyl, 18-ethyl, 7α,18-dimethyl, 7α-methyl-18-ethyl, 7β,18-dimethyl and 7β-methyl-18-ethyl compounds thereof.

Particularly valuable compounds hereof are 17β-(tetrahydropyran-4-yloxy)-androst-4-en-3-one and 17β-(tetrahydropyran-4-yloxy)-5α-androstan-3-one.

The compounds of the present invention exhibit high oral anabolic and androgenic activity and are thus useful for those purposes for which such activity is indicated, for example, in treatment to enhance weight gain and in the treatment of debilitated patients, particularly those recovering in post-operative care. They can also be used in the treatment of male climacteric and dismenorrhea in the female. These compounds can be employed in the same manner as steroid compounds having similar activity, such as oxymetholone, norethandrolone, dromostanolone, testosterone propionate, etc., and provide the benefits and advantages of oral administration because of their high oral activities.

The prior art has reported certain related steroid ethers including 17β-(tetrahydropyran-2-yloxy)-androst-4-en-3-one and 17β-(tetrahydropyran-2-yloxy)-5α-androstan-3-one.

Now it has been discovered that the compounds of the present invention possess unexpected and unobvious anabolic and androgenic activity which is superior to that exhibited by compounds of the closest prior art. Thus, standard tests were conducted for anabolic/androgenic activity which are modifications of the basic methods described by Hershberger et al., Proc. Soc. Exptl. Biol. Med. 83, 175 (1953) and by Dorfman, Methods in Hormone Research, Academy Press, N.Y. (1962), p. 306 of vol. II. These tests demonstrated that 17β - (tetrahydropyran - 4-yloxy)-androst-4-en-3-one has equal to or greater than three times the androgenic activity of 17β-(tetrahydropyran-2-yloxy)-androst-4-en-3-one. This is of particular importance when treatment requiring high androgenic activity is indicated. Similarly, these tests demonstrated that 17β-(tetrahydropyran-4-yloxy)-5α-androstan - 3 - one has greater than four times the anabolic activity and two times the androgenic activity of 17β-(tetrahydropyran-2-yloxy)-5α-androstan-3-one. This is significant when treatment requiring either or both anabolic and androgenic activity is/are indicated.

The compounds of the present invention have thus been shown to be unexpectedly biologically superior to the compounds of the prior art because they possess androgenic and/or anabolic activity far in excess from that which could be predicted.

In addition, it has been surprisingly discovered that the compounds of the present invention, in contrast to the ethers of the prior art, are stable to hydrolysis conditions such as those which are encountered in the animal stomach. The suitability for oral administrations of the compounds is thus enhanced.

The compounds of the present invention are prepared directly by treating the corresponding 17β-hydroxy starting compound with a 4-halotetrahydropyran in organic liquid reaction media, such as benzene, glyme, and dimethylformamide at a temperature of from about 50° C. to about the reflux temperature of the solvent and with the use of sodium or lithium hydride, silver oxide, etc.

Alternatively, 3-keto-Δ⁴-17β-ol starting compounds are treated with 4-methoxy-5,6-dihydro-2H-pyran in the presence of acid to give the corresponding 17β-(4-methoxytetrahydropyran-4-yloxy) compound. This is then treated with acid anhydride or acyl chloride in the presence of sodium methoxide in dimethyl sulfoxide. The resultant 3-acetoxy-Δ³,⁵ compound is then reduced such as with sodium borohydride to give the corresponding 3-hydroxy-Δ⁵ compound. This compound is then treated with lithium aluminum hydride/aluminum chloride to give the corresponding 3β-hydroxy-17β-(tetrahydropyran - 4 - yloxy)-Δ⁵ compound. These compounds are then converted to the corresponding 3-keto-Δ⁴ compounds hereof under Oppenauer conditions and to the corresponding 5α compounds hereof under Birch conditions or by palladium-on-charcoal hydrogenation. The corresponding 2-hydroxymethylene-3-keto-5α compounds (prepared by treating the 3-keto-5α compounds with ethyl formate in base) are hydrogenated to prepare the corresponding 2α-methyl-3-keto-5α-compounds.

The starting compounds of the present invention can be selected from the estrane ($R^1$=H) or androstane ($R^1$=methyl) series. These starting compounds can further be of the normal ($R^2$=H) or C–18 substituted ($R^2$=methyl or ethyl) series. Similarly the starting compounds of the present invention can bear a 7α-methyl or 7β-methyl group ($R^3$). If desired, 2α-methyl-3-keto-5α estrane and androstane compounds can be employed as starting materials with introduction of the C–17β novel ether grouping herein conducted as described above.

The following examples further illustrate the method by which the present invention can be practiced.

EXAMPLE 1

Ten g. of 3-acetoxyandrost-5-en-17β-ol in 150 ml. of ether and 150 mg. of p-toluenesulfonic acid (dried by azeotropic distillation from benzene) are mixed together and the reaction mixture is treated with 4-methoxy-5,6-dihydro-2H-pyran, 1 ml. at a time until reaction complete (followed by t.l.c.). The reaction is quenched by addition of ½ ml. of triethylamine, washed with water, and crystallized with care from methanol containing pyridine to give 3-acetoxy-17β-(4-methoxytetrahydropyran-4-yloxy)-androst-5-ene.

A solution of 14 g. of aluminum chloride in 250 ml. dry ether is treated with a solution of 4 g. of lithium aluminum hydride in 100 ml. of ether. 3-acetoxy-17β-(4-methoxytetrahydropyran-4-yloxy)-androst-5-ene (1.5 g.) is extracted into the solution. An additional 7 g. of steroid is extracted into the lithium aluminum hydride solution. After reduction is complete (monitored by t.l.c.), saturated sodium chloride is added until a precipitate forms. This is filtered and the crude product purified by chromatography on silica gel to yield 17β-(tetrahydropyran-4-yloxy)-androst-5-en-3β-ol.

Two hundred mg. of 17β-(tetrahydropyran-4-yloxy)-androst-5-en-3β-ol in 25 ml. of toluene containing 1 ml. of cyclohexanone is distilled briefly to remove moisture. Freshly distilled aluminum isopropoxide (200 mg.) is added and the mixture is refluxed for 18 hours. The product is isolated by steam distillation, extraction and chromatography to yield 17β-(tetrahydropyran-4-yloxy)-androst-4-en-3-one.

EXAMPLE 2

Ten g. of androst-4-en-17β-ol-3-one in 150 ml. of ether and 150 mg. of p-toluenesulfonic acid (dried by azeotropic distillation from benzene) are mixed together and the reaction mixture is treated with 4-methoxy-5,6-dihydro-2H-pyran, 1 ml. at a time until reaction complete (followed by t.l.c.). The reaction is quenched by addition of ½ ml. of triethylamine, washed with water and crystallized with care from methanol containing pyridine to give 17β - (4-methoxytetrahydropyran-4-yloxy)-androst-4-en-3-one.

The 17β-(4-methoxytetrahydropyran-4-yloxy)-androst-4-en-3-one (2 g.) is dissolved in 20 ml. of dry dimethyl sulfoxide and the solution is heated with one molar equivalent of sodium methoxide under nitrogen at 5–10° C. After 20 minutes, there is added one molar equivalent of acetic anhydride or acetyl chloride. After one hour, saturated brine is added and the precipitate of 3-acetoxy-17β-(4-methoxytetrahydropyran-4-yloxy)-androsta - 3,5-diene is collected, washed with water and carefully dried.

Alternatively, 17β - (4-methoxytetrahydropyran-4-yloxy)androst-4-en-3-one (2 g.) is dissolved in tetrahydrofuran (25 ml.) containing 1.2 equivalents of pure potassium t-butoxide. After 20 minutes there is added one molar equivalent of acetic anhydride or acetyl chloride (neat or dissolved in 10 ml. of tetrahydropyran). After one hour, saturated brine (250 ml.) is added and the 3-acetoxy-17β-(4-methoxytetrahydropyran - 4 - yloxy)-androsta-3,5-diene is isolated by extraction with ethyl acetate.

Twenty g. of 3-acetoxy-17β-(4-methoxytetrahydropyran-4-yloxy)-androsta-3,5-diene in 150 ml. of dioxane is reduced by the addition of sodium borohydride in aqueous dioxane until the reaction is complete. The mixture is poured onto a little dilute hydrogen chloride and ice, filtered, washed to neutral, dried, and recrystallized from methanol to yield 17β-(4-methoxytetrahydropyran-4-yloxy)-androst-5-en-3β-ol.

A solution of 14 g. of aluminum chloride in 250 ml. of dry ether is treated with a solution of 4 g. of lithium aluminum hydride in 100 ml. of ether. 17β-(4-methoxytetrahydropyran-4-yloxy)-androst - 5 - en-3β-ol (1.5 g.) is extracted into the solution. An additional 7 g. of steroid is extracted into the lithium aluminum hydride solution. After reduction is complete (monitored by t.l.c.), saturated sodium chloride is added until a precipitate forms. This is filtered and the crude product purified by chromatography on silica gel to yield 17β-(tetrahydropyran-4-yloxy)-androst-5-en-3β-ol.

Two hundred mg. of 17β-(tetrahydropyran-4-yloxy)-androst-5-en-3β-ol in 25 ml. of toluene containing 1 ml. of cyclohexanone is distilled briefly to remove moisture. Freshly distilled aluminum isopropoxide (200 mg.) is added and the mixture is refluxed for 18 hours. The product is isolated by steam distillation, extraction and chromatography to yield 17β-(tetrahydropyran-4-yloxy)-androst-4-en-3-one.

The other 3-keto compounds of the present invention bearing a novel 17β-(tetrahydropyran-4-yloxy) ether grouping can be prepared from the corresponding starting materials. Thus, for example, there are prepared 17β-(tetrahydropyran-4-yloxy)-estr-4-en-3-one, 7α-methyl-17β-(tetrahydropyran-4-yloxy)-estr-4-en-3-one, 7β-methyl-17β-(tetrahydropyran-4-yloxy)-estr-4-en-3-one, 7α-methyl-17β-(tetrahydropyran-4-yloxy)-androst-4-en-3-one, 7β-methyl-17β-(tetrahydropyran-4-yloxy)-androst-4-en-3-one, 17β-(tetrahydropyran-4-yloxy)-18-methylestr-4-en-3-one, 17β-(tetrahydropyran-4-yloxy)-18-methylandrost-4-en-3-one, 7α-methyl-17β-(tetrahydropyran-4-yloxy)-18-methyl-androst-4-en-3-one, 7α-methyl-17β-(tetrahydropyran-4-yloxy)-18-methylestr-4-en-3-one, 7β-methyl-17β-(tetrahydropyran-4-yloxy)-18-methylestr-4-en-3-one, and 7β-methyl-17β-(tetrahydropyran-4-yloxy)-18-methyl-androst-4-en-3-one.

EXAMPLE 3

To a solution of 1 g. of 17β-(tetrahydropyran-4-yloxy)-androst-4-en-3-one in 75 ml. of tetrahydrofuran and 125 ml. of liquid ammonia is added over a 20 minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride:acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 17β-(tetrahydropyran-4-yloxy)-5α-androstan-3-one which may be further purified through recrystallization from ether:hexane.

In a similar manner, the compounds prepared as described in Examples 1 and 2 above are thus treated to prepare the corresponding 3-keto-5α-compounds:

17β-(tetrahydropyran-4-yloxy)-5α-estran-3-one,
7α-methyl-17β-(tetrahydropyran-4-yloxy)-5α-estran-3-one,
7β-methyl-17β-(tetrahydropyran-4-yloxy)-5α-estran-3-one,
7α-methyl-17β-(tetrahydropyran-4-yloxy)-5α-androstan-3-one,
7β-methyl-17β-(tetrahydropyran-4-yloxy)-5α-androstan-3-one,
17β-(tetrahydropyran-4-yloxy)-18-methyl-5α-estran-3-one,
17β-(tetrahydropyran-4-yloxy)-18-methyl-5α-androstan-3-one,
7α-methyl-17β-(tetrahydropyran-4-yloxy)-18-methyl-5α-androstan-3-one,
7α-methyl-17β-(tetrahydropyran-4-yloxy)-18-methyl-5α-androstan-3-one,
7β-methyl-17β-(tetrahydropyran-4-yloxy)-18-methyl-5α-estran-3-one, and
7β-methyl-17β-(tetrahydropyran-4-yloxy)-18-methyl-5α-androstan-3-one.

EXAMPLE 4

To a stirred solution of 3 g. of 17β-(tetrahydropyran-4-yloxy)-5α-androstan-3-one in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-17β-(tetrahydropyran-4-yloxy)-5α-androstan-3-one which is recrystallized from methylene chloride:hexane.

In a similar manner, the corresponding 2-hydroxymethylene compounds of the other compounds prepared as set forth in Example 3 can be prepared, for example, 2-hydroxymethylene-17β-(tetrahydropyran-4-yloxy)-5α-estran-3-one,
2-hydroxymethylene-7α-methyl-17β-(tetrahydropyran-4-yloxy)-5α-estran-3-one,
2-hydroxymethylene-7β-methyl-17β-(tetrahydropyran-4-yloxy)-5α-estran-3-one,
2-hydroxymethylene-7α-methyl-17β-(tetrahydropyran-4-yloxy)-5α-androstan-3-one,
2-hydroxymethylene-7β-methyl-17β-(tetrahydropyran-4-yloxy)-5α-androstan-3-one,
2-hydroxymethylene-17β-(tetrahydropyran-4-yloxy)-18-methyl-5α-estran-3-one,
2-hydroxymethylene-17β-(tetrahydropyran-4-yloxy)-18-methyl-5α-androstan-3-one,
2-hydroxymethylene-7α-methyl-17β-(tetrahydropyran-4-yloxy)-18-methyl-5α-androstan-3-one,
2-hydroxymethylene-7α-methyl-17β-(tetrahydropyran-4-yloxy)-18-methyl-5α-estran-3-one,
2-hydroxymethylene-7β-methyl-17β-(tetrahydropyran-4-yloxy)-18-methyl-5α-estran-3-one, and
2-hydroxymethylene-7b-methyl-17β-(tetrahydropyran-4-yloxy)-18-methyl-5α-androstan-3-one.

EXAMPLE 5

A mixture of 5 g. of 17β-(tetrahydropyran-4-yloxy)-5α-androstan-3-one in 40 ml. of anhydrous thiophene-free benzene, 2 ml. of ethyl formate and 1.5 g. of sodium hydride is stirred for 8 hours under nitrogen. The solid which forms is collected by filtration, washed with benzene and then hexane and dried in vacuo. This material is then cautiously added in portions to excess ice-cold dilute hydrochloric acid with stirring. The solid which forms is collected by filtration, washed with water and air dried. One gram of the product in 15 ml. of methanol is hydrogenated with 0.4 g. of prehydrogenated 10% palladium carbon catalyst at 25° C. atmospheric pressure until two moles of hydrogen are absorbed. The mixture is then filtered, the catalyst is washed with hot methanol and the combined solutions are evaporated to dryness to yield 2α-methyl-17β-(tetrahydropyran-4-yloxy)-5α-androstan-3-one.

In a similar manner, the compounds prepared as described in Example 3 above can be converted to the corresponding 2α-methyl compounds, for example, 2α-methyl-17β-(tetrahydropyran-4-yloxy)-5α-estran-3-one,
2α,7α-dimethyl-17β-(tetrahydropyran-4-yloxy)-5α-estran-3-one,
2α,7β-dimethyl-17β-(tetrahydropyran-4-yloxy)-5α-estran-3-one,
2α,7α-dimethyl-17β-(tetrahydropyran-4-yloxy)-5α-androstan-3-one,
2α,7β-dimethyl-17β-(tetrahydropyran-4-yloxy)-5α-androstan-3-one,
2α-methyl-17β-(tetrahydropyran-4-yloxy)-18-methyl-5α-estran-3-one,
2α-methyl-17β-(tetrahydropyran-4-yloxy)-18-methyl-5α-androstan-3-one,
2α,7α-dimethyl-17β-(tetrahydropyran-4-yloxy)-18-methyl-5α-androstan-3-one,
2α,7α-dimethyl-17β-(tetrahydropyran-4-yloxy)-18-methyl-5α-estran-3-one,
2α,7β-dimethyl-17β-(tetrahydropyran-4-yloxy)-18-methyl-5α-estran-3-one, and
2α,7β-dimethyl-17β-(tetrahydropyran-4-yloxy)-18-methyl-5α-androstan-3-one.

EXAMPLE 6

A solution of 3 g. of 2-hydroxymethylene-17β-(tetrahydropyran-4-yloxy)-5α-androstan-3-one in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield 2α-methyl-17β-(tetrahydropyran-54-yloxy)-5α-androstan-3-one which is recrystallized from acetone.

In a similar manner, the products of the procedure of Example 4 above can be converted to the corresponding 2α-methyl compounds.

EXAMPLE 7

A suspension of 0.5 g. of 5% palladium-on-carbon catalyst in 50 ml. of methanol is hydrogenated for 30 minutes. A solution of 2 g. of 17β-(tetrahydropyran-4-yloxy)-androst-5-en-3β-ol in 200 ml. of methanol is added and hydrogenated with agitation until the uptake of hydrogen has ceased. The catalyst is removed by filtration and the solution was evaporated to yield 17β-(tetrahydropyran-4-yloxy)-5α-androstan-3-one which is recrystallized from methylene chloride:hexane for further purification.

To a stirred solution of 1 g. of 17β-(tetrahydropyran-4-yloxy)-5α-androstan-3β-ol in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 17β-(tetrahydropyran-4-yloxy)-5α-androstan-3-one which may be further purified by recrystallization from acetone:hexane.

EXAMPLE 8

A mixture of one g. of 5α-androstan-17β-ol-3-one and five g. of 4-iodotetrahydropyran in 25 ml. of benzene is distilled under nitrogen to remove moisture. Three grams of silver carbonate are then added and the mixture refluxed for 3 hours. The mixture is then chromatographed (7:1 hexane:ethyl acetate) over silica gel to give 17β-(tetrahydropyran-4-yloxy)-5α-androstan-3-one.

EXAMPLE 9

Forty g. of 3β-acetoxyandrost-5-en-17-one in 1.4 l. of ethanol is hydrogenated with 5 g. of 10% palladium-on-charcoal to yield 3β-acetoxy-5α-androstan-17-one.

3β-acetoxy-5α-androstan-17-one (25 g.) in 300 ml. of dioxane and 10% water is cooled to 0° C. Sodium borohydride (ca. 3 g.) is added. After the reduction is complete, the mixture is poured into water, ice and dilute hydrogen chloride. The resultant mixture is filtered and crystallized from benzene:hexane to yield 3β-acetoxy-5α-androstan-17β-ol.

3β-acetoxy - 5α - androstan - 17β - ol (14 g.) is dispersed in 150 ml. of ether. P-toluenesulfonic acid (100 mg.) in benzene (dried azeotropically) is added to the solution. 4-methoxy - 5,6 - dihydro - 2H - pyran is added 1 ml. at a time over 6 hours. The mixture is quenched with triethylamine. Filtration crystallizes 3β-acetoxy-17β-(4-methoxytetrahydropyran-4-yloxy)-5α-androstane.

Hydrolysis with potassium hydroxide in methanol gives 17β - (4 - methoxytetrahydropyran - 4 - yloxy)-5α-androstan-3β-ol. This compound is treated with aluminum chloride/lithium aluminum hydride, as described above, to give 17β - (tetrahydropyran - 4 - yloxy) - 5α - androstan-3β-ol which is oxidized (Jones), as described above, to give 17β - (tetrahydropyran-4-yloxy)-5α-androstan-3-one.

What is claimed is:

1. A compound selected from the group of compounds represented by the following formulas:

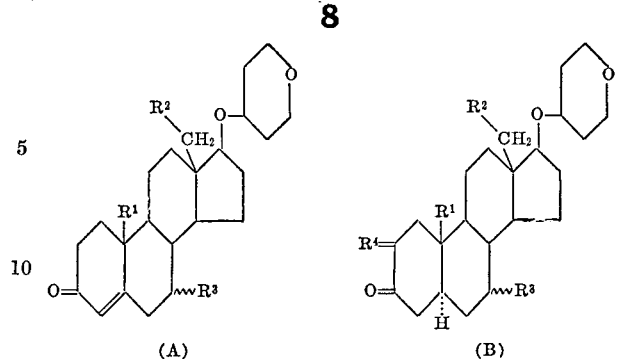

wherein
R¹ is hydrogen or methyl;
R² is hydrogen, methyl, or ethyl;
R³ is hydrogen, α-methyl, or β-methyl;
R⁴ is hydroxymethylene or the group

in which R⁵ is hydrogen or methyl.

2. The compound selected from those of claim 1 of the formula:

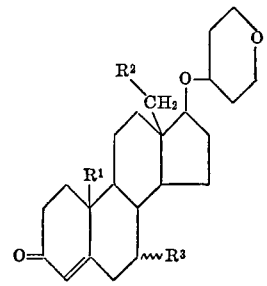

wherein each of R¹, R², and R³ is as therein defined.

3. The compound selected from those of claim 2 wherein R³ is α-methyl.

4. The compound selected from those of claim 2 wherein R³ is hydrogen.

5. The compound selected from those of claim 4 wherein each of R¹ and R² is hydrogen; 17β-(tetrahydropyran-4-yloxy)-estr-4-en-3-one.

6. The compound selected from those of claim 4 wherein R¹ is methyl and R² is hydrogen; 17β-(tetrahydropyran-4-yloxy)-androst-4-en-3-one.

7. The compound selected from those of claim 4 wherein R¹ is hydrogen and R² is methyl; 17β-(tetrahydropyran-4-yloxy)-18-methylestr-4-en-3-one.

8. The compound selected from those of claim 4 wherein each of R¹ and R² is methyl; 17β-(tetrahydropyran-4-yloxy)-18-methylandrost-4-en-3-one.

9. The compound according to claim 2 wherein R¹ is methyl, R² is hydrogen, and R³ is methyl.

10. The compound selected from those of claim 1 of the formula:

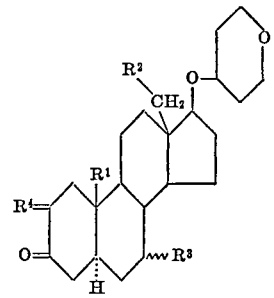

wherein each of R¹, R², R³, and R⁴ is as therein defined.

11. A compound selected from those of claim 10 wherein $R^3$ is hydrogen and $R^4$ is the group

in which $R^5$ is hydrogen.

12. The compound selected from those of claim 11 wherein $R^1$ is methyl and $R^2$ is hydrogen; 17β-(tetrahydropyran-4-yloxy)-5α-androstan-3-one.

13. The compound selected from those of claim 11 wherein each of $R^1$ and $R^2$ is hydrogen; 17β-(tetrahydropyran-4-yloxy)-5α-estran-3-one.

14. The compound selected from those of claim 11 wherein $R^1$ is hydrogen and $R^2$ is methyl; 17β-(tetrahydropyran-4-yloxy)-18-methyl-5α-estran-3-one.

15. The compound selected from those of claim 11 wherein each of $R^1$ and $R^2$ is methyl; 17β-(tetrahydropyran-4-yloxy)-18-methyl-5α-androstan-3-one.

16. The compound according to claim 10 wherein $R^1$ is methyl, $R^2$ is hydrogen, $R^3$ is hydrogen and $R^4$ is the group

in which $R^5$ is methyl; 2α-methyl-17β-(tetrahydropyran-4-yloxy)-5α-androstan-3-one.

17. The compound according to claim 10 wherein $R^1$ is methyl, $R^2$ is hydrogen, $R^3$ is methyl and $R^4$ is the group

in which $R^5$ is hydrogen.

References Cited

UNITED STATES PATENTS 3,514,446   5/1970   Cross et al. _____ 260—239.55

FOREIGN PATENTS 1,041,522   9/1966   Great Britain _____ 260—239.55

ELBERT L. ROBERTS, Primary Examiner

U.S. Cl. X.R.

424—241